United States Patent
Kimura

(10) Patent No.: US 9,358,686 B2
(45) Date of Patent: Jun. 7, 2016

(54) ROBOT SYSTEM

(71) Applicant: KABUSHIKI KAISHA YASKAWA DENKI, Fukuoka (JP)

(72) Inventor: Yoshiki Kimura, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 269 days.

(21) Appl. No.: 13/670,667

(22) Filed: Nov. 7, 2012

(65) Prior Publication Data

US 2013/0190923 A1    Jul. 25, 2013

(30) Foreign Application Priority Data

Jan. 24, 2012   (JP) .................................. 2012-011968

(51) Int. Cl.
    *B25J 9/16*       (2006.01)
    *B25J 19/02*      (2006.01)

(52) U.S. Cl.
    CPC ................. *B25J 9/1612* (2013.01); *B25J 19/02* (2013.01); *G05B 2219/37002* (2013.01); *G05B 2219/39476* (2013.01); *Y10S 901/46* (2013.01)

(58) Field of Classification Search
    CPC ................... B25J 9/1612; B25J 19/02; G05B 2219/39476; G05B 2219/37002; Y10S 901/46
    USPC .................................................. 700/245–264
    See application file for complete search history.

(56) References Cited

U.S. PATENT DOCUMENTS

| 6,593,718 B1 | 7/2003 | Yamazoe |
| 8,181,769 B2 | 5/2012 | Hishiya et al. |
| 2004/0048474 A1* | 3/2004 | Asano ............... H01L 21/67259 438/689 |
| 2010/0161124 A1* | 6/2010 | Kimura .................. B25J 9/1666 700/251 |
| 2010/0209225 A1* | 8/2010 | Matsuo et al. ............. 414/744.5 |

FOREIGN PATENT DOCUMENTS

| CN | 101337353 A | 1/2009 |
| JP | H11-307612 A | 11/1999 |
| JP | 2001-144166 A | 5/2001 |
| JP | 2002-141395 A | 5/2002 |
| JP | 2011-060994 A | 3/2011 |
| JP | 2011-159738 | 8/2011 |
| JP | 4821756 B2 | 11/2011 |
| KR | 2001-0050352 A | 6/2001 |

OTHER PUBLICATIONS

Korean Office Action dated Sep. 18, 2014 issued in corresponding Korean application No. 10-2012-0125130 and the English translation thereof.

(Continued)

*Primary Examiner* — James Trammell
*Assistant Examiner* — Adam Mott
(74) *Attorney, Agent, or Firm* — Bacon & Thomas, PLLC

(57) ABSTRACT

A robot system includes: a robot including a hand configured to hold a thin plate-shaped workpiece and an arm configured to move the hand; and a robot controller configured to control the robot. The robot controller controls the robot to perform a transfer of the workpiece at a predetermined workpiece transfer position in such a way that the hand is moved in a horizontal direction while being moved in a vertical direction after the hand has reached the workpiece transfer position.

10 Claims, 11 Drawing Sheets

(56) References Cited

OTHER PUBLICATIONS

Chinese Office Action dated Nov. 3, 2014 issued in corresponding Chinese application No. 201210440173.6 and the English translation thereof.
Japanese Office Action dated Nov. 19, 2013 issued in corresponding Japanese Application No. 2012-011968 and English translation thereof.
Japanese Office Action dated Feb. 24, 2015 issued in corresponding Japanese application No. 2012-11968 and English translation thereof.
Taiwanese Office Action dated Mar. 26, 2015 issued in corresponding Taiwanese application No. 101141014 and English translation thereof.
Chinese Office Action, including search report, dated Jul. 2, 2015 issued in corresponding Chinese Patent Application No. 201210440173.6 and English translation thereof.

* cited by examiner

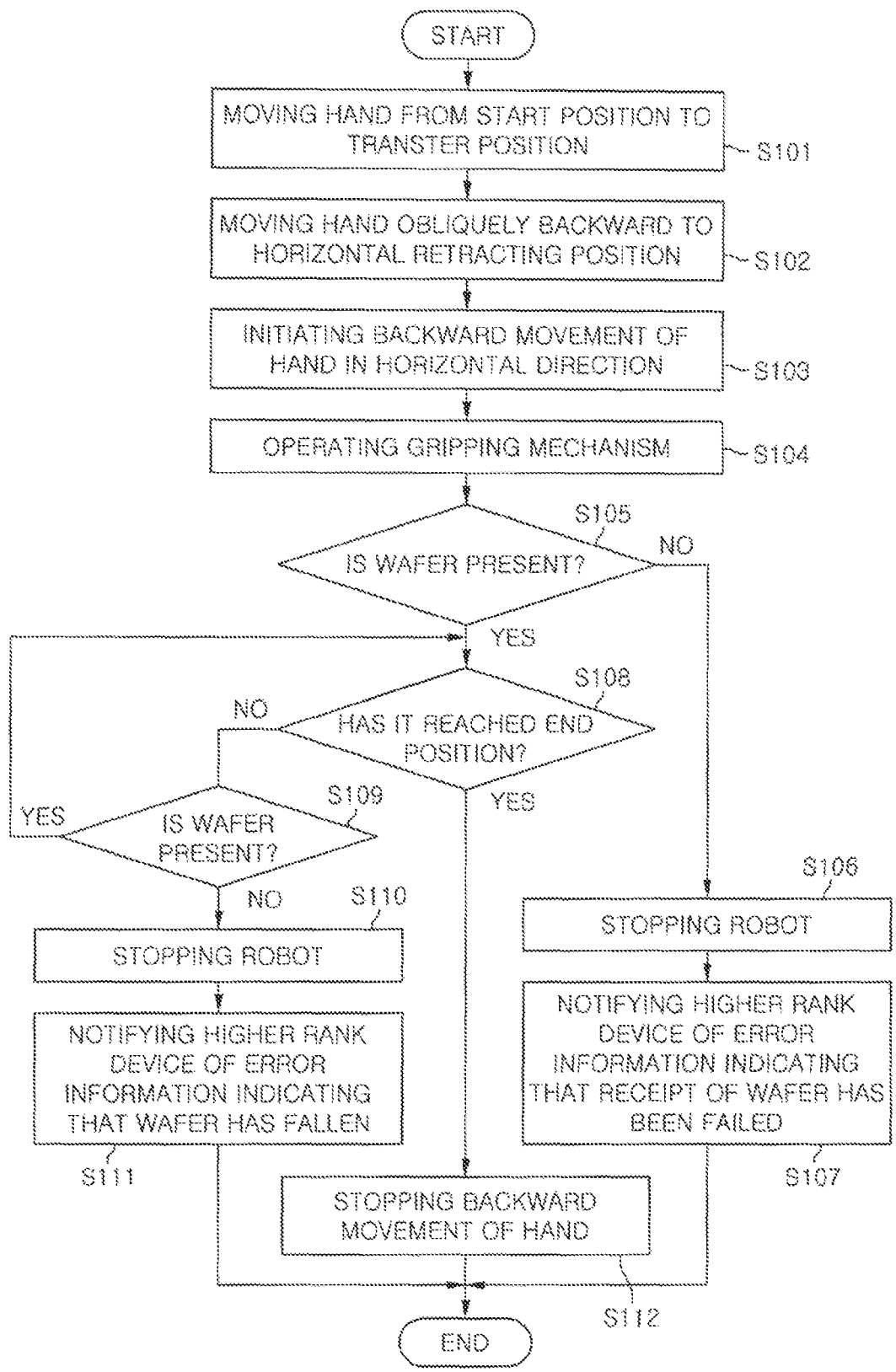

ROBOT SYSTEM

CROSS-REFERENCE TO RELATED APPLICATIONS

The present disclosure contains subject matter related to that disclosed in Japanese Priority Patent Application No. 2012-011968 filed with the Japan Patent Office on Jan. 24, 2012, the entire contents of which are incorporated herein by reference.

BACKGROUND OF THE INVENTION

1. Field of the Invention

Embodiments disclosed herein relate to a robot system.

2. Background of the Invention

Conventionally, there has been known a robot system using a robot such as a horizontal multi-joint robot to load/unload a substrate such as a wafer to/from a processing unit in a semiconductor manufacturing process.

The robot used in the robot system includes, e.g., a lifting part movable in the vertical direction, a first arm whose base end portion is rotatably connected to the lifting part, and a second arm whose base end portion is rotatably connected to a tip end portion of the first arm. Further, the robot includes a hand for mounting a substrate thereon at a tip end portion of the second arm.

The robot performs the transfer of the substrate to/from the processing unit by sequentially performing an operation of moving the hand in the vertical direction using the lifting part, and an operation of moving the hand in the horizontal direction using the first arm and the second arm (see, e.g., Japanese Patent Laid-open Publication No. 2011-159738).

SUMMARY OF THE INVENTION

In accordance with an aspect of the embodiments, there is provided a robot system which has a robot and a robot controller. The robot includes a hand for holding a thin plate-shaped workpiece, and an arm for moving the hand. The robot controller controls the robot. Further, when the robot controller controls the robot to perform the transfer of the workpiece at a predetermined workpiece transfer position, the hand reaches the workpiece transfer position, the hand moves in the horizontal direction while moving in the vertical direction.

BRIEF DESCRIPTION OF THE DRAWINGS

FIG. 7 is a flowchart showing a processing procedure of a wafer receiving process;

DETAILED DESCRIPTION OF THE EMBODIMENTS

Hereinafter, embodiments of the robot system disclosed herein will be described in detail with reference to the accompanying drawings which form a part hereof. Although a robot includes two hands, i.e., an upper hand and a lower hand in the following embodiments, the robot may be configured to include only one hand. Further, it is not intended that the invention be limited to the embodiments described below.

First Embodiment

Figure 1:
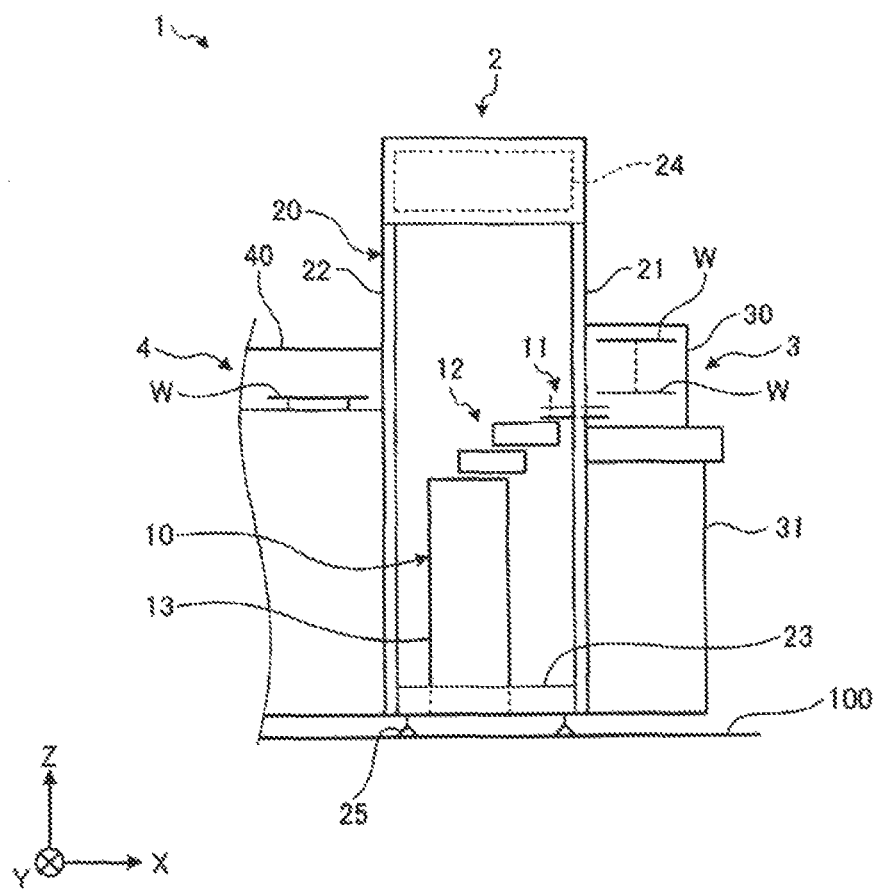
FIG. 1 is a schematic diagram showing a configuration of a robot system in accordance with a first embodiment.

First, a configuration of a robot system in accordance with a first embodiment will be described with reference to FIG. 1. FIG. 1 is a schematic diagram showing a configuration of a robot system in accordance with the first embodiment.

Further, in the following description, in order to clarify a positional relationship, an X-axis direction, a Y-axis direction and a Z-axis direction, which are orthogonal to each other, are defined. Furthermore, a vertical upward direction is set as the positive Z-axis direction, and a horizontal direction is set as the X-axis direction and the Y-axis direction.

As shown in FIG. 1, a robot system 1 in accordance with the first embodiment includes a substrate transfer unit 2, a substrate supply unit 3, and a substrate processing unit 4. The substrate transfer unit 2 includes a robot 10, and a housing 20 accommodating the robot 10.

The robot 10 includes a hand 11 capable of holding a wafer W to be transferred, an arm 12 which moves the hand 11 in the horizontal direction, and a base 13 which supports the arm 12 to be movable up and down and rotatable in the horizontal direction. The base 13 is mounted on a base mounting frame 23 forming a bottom wall of the housing 20.

The robot 10 performs a transfer operation of the wafer W between the substrate supply unit 3 and the substrate processing unit 4, e.g., an operation of receiving the wafer W from the substrate supply unit 3 and delivering the received wafer W to the substrate processing unit 4.

Further, the hand 11 of the robot 10 is provided with a gripping mechanism 11c to grip the wafer W. A specific configuration and operation of the robot 10 as well as the gripping mechanism 11c will be described later with reference to FIG. 2.

In the housing 20, a down flow of clean air is formed by a filter unit 24 which is a local clean device called, e.g., an equipment front end module (EFEM) and provided at an upper portion of the housing 20. By this down flow, the inside of the housing 20 is maintained in a high cleanliness state.

Further, legs 25 are provided on the lower surface of the base mounting frame 23, and a predetermined clearance is formed between the housing 20 and a mounting surface 100 by the legs 25.

The substrate supply unit 3 is connected to a side surface 21 of the housing 20 in the positive X-axis direction to communicate with the inside of the housing 20. Further, the substrate processing unit 4 is connected to a side surface 22 of the housing 20 in the negative X-axis direction to communicate with the inside of the housing 20. Thus, in the robot system 1, the substrate supply unit 3 and the substrate processing unit 4 are connected to each other with the housing 20 therebetween.

The substrate supply unit 3 includes a hoop 30 accommodating a plurality of wafers W in multiple stages in the vertical direction, and a table 31 for supporting the hoop 30 at a predetermined height. A lid (not shown) is arranged in the hoop 30 in a state facing the housing 20, and the hoop 30 is connected to the housing 20 via a hoop opener (not shown) performing the opening and closing of the lid. Further, a plurality of hoops may be arranged along the Y direction with respect to the table 31.

The substrate processing unit 4 is a processing unit performing a predetermined process such as a cleaning process, a film forming process, and a photolithography process on the wafer W in a semiconductor manufacturing process. The substrate processing unit 4 includes a processing device 40 performing the predetermined process.

The robot system 1 is configured as described above, and performs an operation of transferring the wafer W accommodated in the hoop 30 to the processing device 40 by using the robot 10, transferring the wafer W processed by the processing device 40 to the hoop 30, or the like.

Here, in the robot system 1 in accordance with the first embodiment, studies are conducted on the operation timing of the gripping mechanism 11c which performs gripping of the wafer W, or the trajectory of the hand 11 to shorten the time required for the transfer of the wafer W or prevent rubbing of the wafer W. This configuration will be described in detail below.

Figure 2:
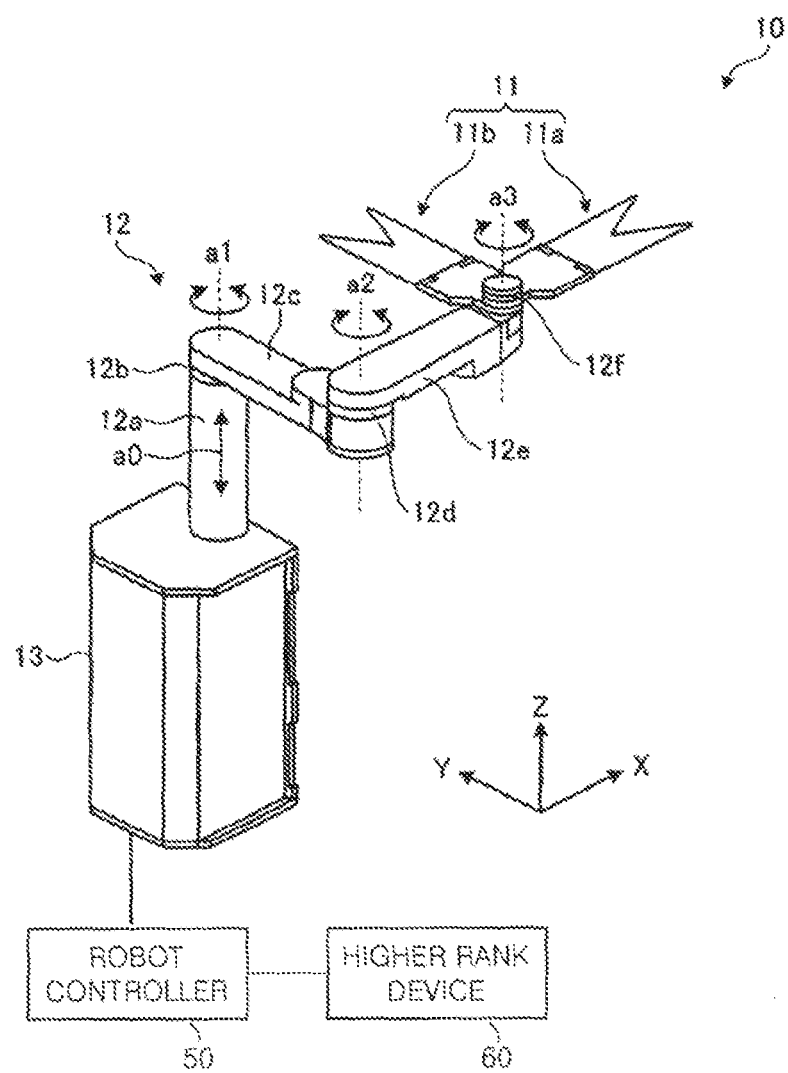
FIG. 2 is a schematic diagram showing a configuration of a robot.

FIG. 2 is a schematic diagram showing a configuration of the robot 10. As shown in FIG. 2, the robot 10 in accordance with the first embodiment includes the hand 11, the arm 12 and the base 13. Further, the arm 12 includes a lifting part 12a, joint units 12b, 12d and 12f, a first arm unit 12c, and a second arm unit 12e.

The base 13 is a base portion of the robot 10 which is mounted on the base mounting frame 23 (see FIG. 1). The lifting part 12a is provided to be slidable in the vertical direction (Z-axis direction) from the base 13 (see double-headed arrow a0 in FIG. 2) such that the arm 12 is elevated in the vertical direction.

The joint unit 12b is a rotational joint rotating around an axis a1 (see double-headed arrow around the axis a1 in FIG. 2). The first arm unit 12c is rotatably connected to the lifting part 12a via the joint unit 12b.

Further, the joint unit 12d is a rotational joint rotating around an axis a2 (see double-headed arrow around the axis a2 in FIG. 2). The second arm unit 12e is rotatably connected to the first arm unit 12c via the joint unit 12d. Further, the joint unit 12f is a rotational joint rotating around an axis a3 (see double-headed arrow around the axis a3 in FIG. 2). The hand 11 is rotatably connected to the second arm unit 12e via the joint unit 12f.

A drive source such as a motor (not shown) is provided in the robot 10, and the joint units 12b, 12d and 12f are driven to rotate by the drive source. The arm 12 is operated by rotating the joint units 12b, 12d and 12f and the hand 11 linearly moves in the horizontal direction.

Further, in the following description, the movement of the hand 11 in the positive X-axis direction is referred to as "forward movement" and the movement of the hand 11 in the negative X-axis direction is referred to as "backward movement."

The hand 11 is an end effector for holding the wafer W, and includes two hands, i.e., an upper hand 11a and a lower hand 11b with different height positions, respectively. The upper hand 11a and the lower hand 11b are provided close to each other with the axis a3 as a common pivot axis, and can be pivoted about the axis a3 independently.

Hereinafter, for the sake of understanding, a case where the robot 10 transfers wafers W one by one by using only the upper hand 11a will be described. However, the robot 10 may transfer two wafers W at the same time by using the upper hand 11a and the lower hand 11b.

The robot 10 is connected to a robot controller 50 such that the robot 10 and the robot controller 50 can communicate with each other via a communication line such as a local area network (LAN), and the operation of the robot is controlled by the robot controller 50. The robot controller 50 is disposed, e.g., on the outside of the housing 20, or the inside of the robot 10 in the housing 20 (see FIG. 1). Further, the robot 10 and the robot controller 50 may also be integrated.

The control of various operations of the robot 10 is performed by the robot controller 50 on the basis of operation pattern information stored in advance in the robot controller 50.

The robot controller 50 is also connected to an upper device 60 such that they can communicate with each other via a communication line such as a LAN. The upper device 60 is a device which performs overall control of the robot system 1, for example, to transmit processing information related to the process to the robot controller 50, or monitor the state of the robot 10.

Figure 3:
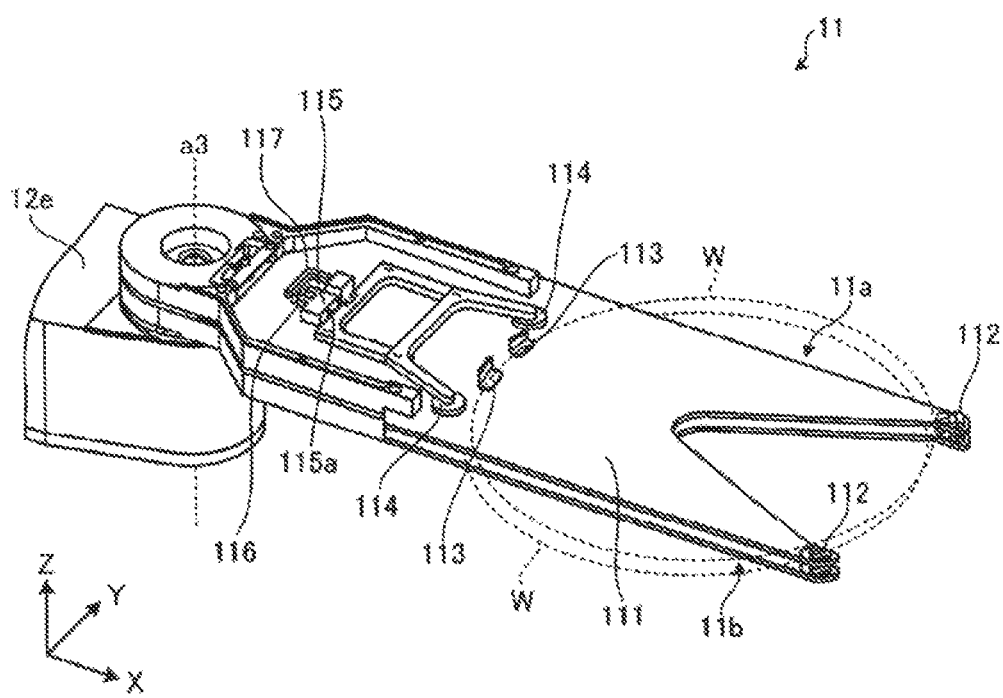
FIG. 3 is a schematic perspective view of a hand.

Next, a detailed configuration of the hand 11 will be described with reference to FIG. 3. FIG. 3 is a schematic perspective view of the hand 11. In FIG. 3, each of the upper hand 11a and the lower hand 11b has a tip end oriented in the positive X-axis direction.

As shown in FIG. 3, the hand 11 consists of the upper hand 11a and the lower hand 11b. Further, the upper hand 11a and the lower hand 11b are provided close to each other with the axis a3 as a common pivot axis at a tip end of the second arm unit 12e.

The following description will be made mainly focusing on the upper hand 11a, and a detailed description of the lower hand 11b having the same configuration will be omitted. Accordingly, the upper hand 11a is simply referred to as "hand 11" in the following description.

The hand 11 includes a plate 111, a tip end side engaging part 112, a base end side engaging part 113, a pressing drive part 115, and a pressing part 114. The plate 111 is a member corresponding to a base or base portion on which the wafer W is placed. Although the plate 111 having a V-shaped tip end portion is illustrated in FIG. 3, the shape of the plate 111 is not limited to the illustrated example.

The tip end side engaging part 112 is disposed at a tip end of the plate 111. Further, the base end side engaging part 113 is disposed at a base end of the plate 111. The wafer W is placed between the tip end side engaging part 112 and the base end side engaging part 113.

Further, the hand 11 may be configured to include only the tip end side engaging part 112. Further, the shape of the tip end side engaging part 112 and the base end side engaging part 113 is not particularly limited as long as it has surfaces in contact with the wafer W at least in the horizontal direction and the vertical direction.

The pressing part 114 is provided to be movable in the positive X-axis direction and the negative X-axis direction, i.e., movable forward and backward with respect to the wafer W mounted on the plate 111. Further, the pressing part 114 is provided on the plate 111 in a state of being biased in the negative X-axis direction.

The pressing drive part 115 is fixedly provided at the opposite side to the tip end side engaging part 112 with the pressing part 114 therebetween, and includes a protrusion 115a movable forward and backward with respect to the pressing part 114. The protrusion 115a is configured using, e.g., an air cylinder or the like.

The pressing drive part 115 moves the pressing part 114 toward the wafer W by protruding the protrusion 115a toward the pressing part 114.

As a result, the wafer W is pushed toward the tip end side engaging part 112 by the pressing part 114, and a peripheral part of the wafer W opposite to the pressing part 114 is in contact with the tip end side engaging part 112. Thus, the wafer W is in a state of being sandwiched between the pressing part 114 and the tip end side engaging part 112, i.e., a state of being grasped by the hand 11.

Thus, in the robot system 1, the gripping mechanism 11c for gripping the wafer W is formed by the tip end side engaging part 112, the pressing part 114 and the pressing drive part 115. Further, the shape of the pressing part 114, the pressing drive part 115 or the like shown in FIG. 3 is an example without being limited thereto.

Further, the hand 11 further includes a wafer detection mechanism 11d to determine the presence or absence of the wafer W. Specifically, the hand 11 further includes a photoelectric sensor 116 fixed to the pressing drive part 115, and a light shielding unit 117 movable back and forth along with the pressing part 114. That is, the wafer detection mechanism 11d is constituted by the photoelectric sensor 116 and the light shielding unit 117.

Figure 4A:
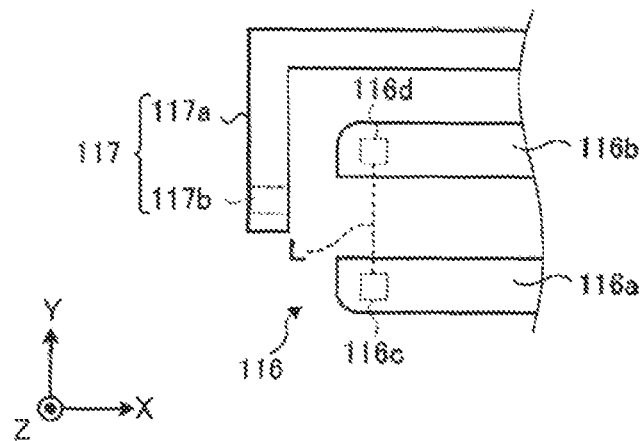
FIGS. 4A to 4C are views for explaining a configuration and operation of a wafer detection mechanism.
Figure 4B:
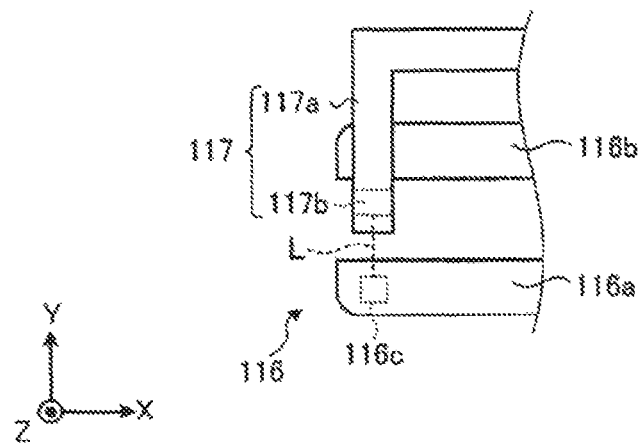
Figure 4C:
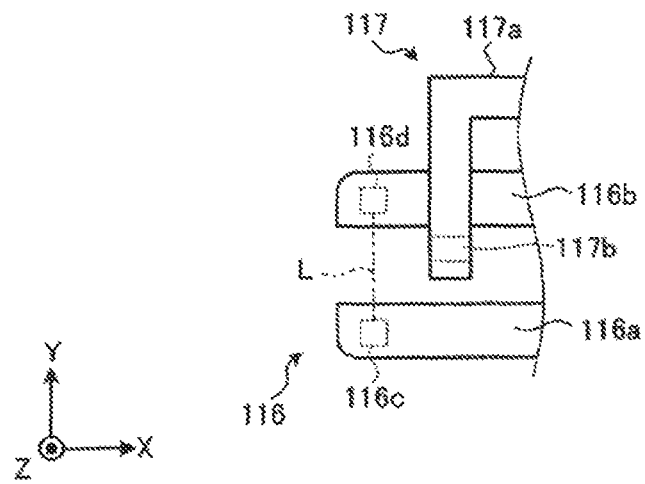

A configuration and operation of the wafer detection mechanism 11d will be described in detail with reference to FIGS. 4A to 4C. FIGS. 4A to 4C are explanatory diagrams of the configuration and operation of the wafer detection mechanism.

As shown in FIG. 4A, the photoelectric sensor 116 includes a pair of sidewalls 116a and 116b disposed at a predetermined interval along the Y-axis direction. The sidewall 116a is provided with a light emitting unit 116c for irradiating light L toward the other sidewall 116b. Further, the sidewall 116b is provided with a light receiving unit 116d for receiving the light L irradiated from the light emitting unit 116c. The photoelectric sensor 116 transmits information on the state where the light L is received by the light receiving unit 116d, to the robot controller 50.

The light shielding unit 117 includes a first member 117a provided above the pair of sidewalls 116a and 116b, and a second member 117b protruding vertically downward from the bottom of the first member 117a.

The light shielding unit 117 is fixed to the pressing part 114, and is moved with the movement of the pressing part 114. In this case, the second member 117b of the light shielding unit 117 moves between the pair of sidewalls 116a and 116b. Further, the second member 117b of the light shielding unit 117 is disposed at a position shielding the light L from the light emitting unit 116c as shown in FIG. 4B, in the state where the wafer W is held by the pressing part 114 and the tip end side engaging part 112.

At this point, the light receiving state of the light receiving unit 116d is changed from "light-receiving" to "light-shielding." Accordingly, in the case where the light receiving state is "light-shielding," the robot controller 50 determines that the wafer W is present on the hand 11.

On the other hand, when the wafer W is absent on the hand 11, the pressing part 114 (see FIG. 3) comes to move much more forward than when the wafer W is present on the hand 11. As a result, as shown in FIG. 4C, the second member 117b of the light shielding unit 117 is stopped at a position more forward (i.e., closer to the tip end of the hand 11) than the position where the light L from the light emitting unit 116c is shielded.

At this point, the light receiving state of the light receiving unit 116d is "light-receiving." Accordingly, in the case where the light receiving state is "light-receiving," the robot controller 50 determines that the wafer W is absent on the hand 11.

Thus, in the robot system 1, it is possible to realize the presence or absence of the wafer W by using the wafer detection mechanism. Here, an example in which the wafer detection mechanism 11d is constituted by the photoelectric sensor 116 and the light shielding unit 117 has been described, but the wafer detection mechanism 11d may have other configurations.

For example, the wafer detection mechanism 11d may be constituted by using a stroke sensor for detecting the amount of movement of the pressing part 114 or the protrusion 115a. In this case, the robot controller 50 may determine that the wafer W is absent on the hand 11 if the amount of movement of the pressing part 114 or the protrusion 115a is greater than a predetermined threshold value.

Figure 5:
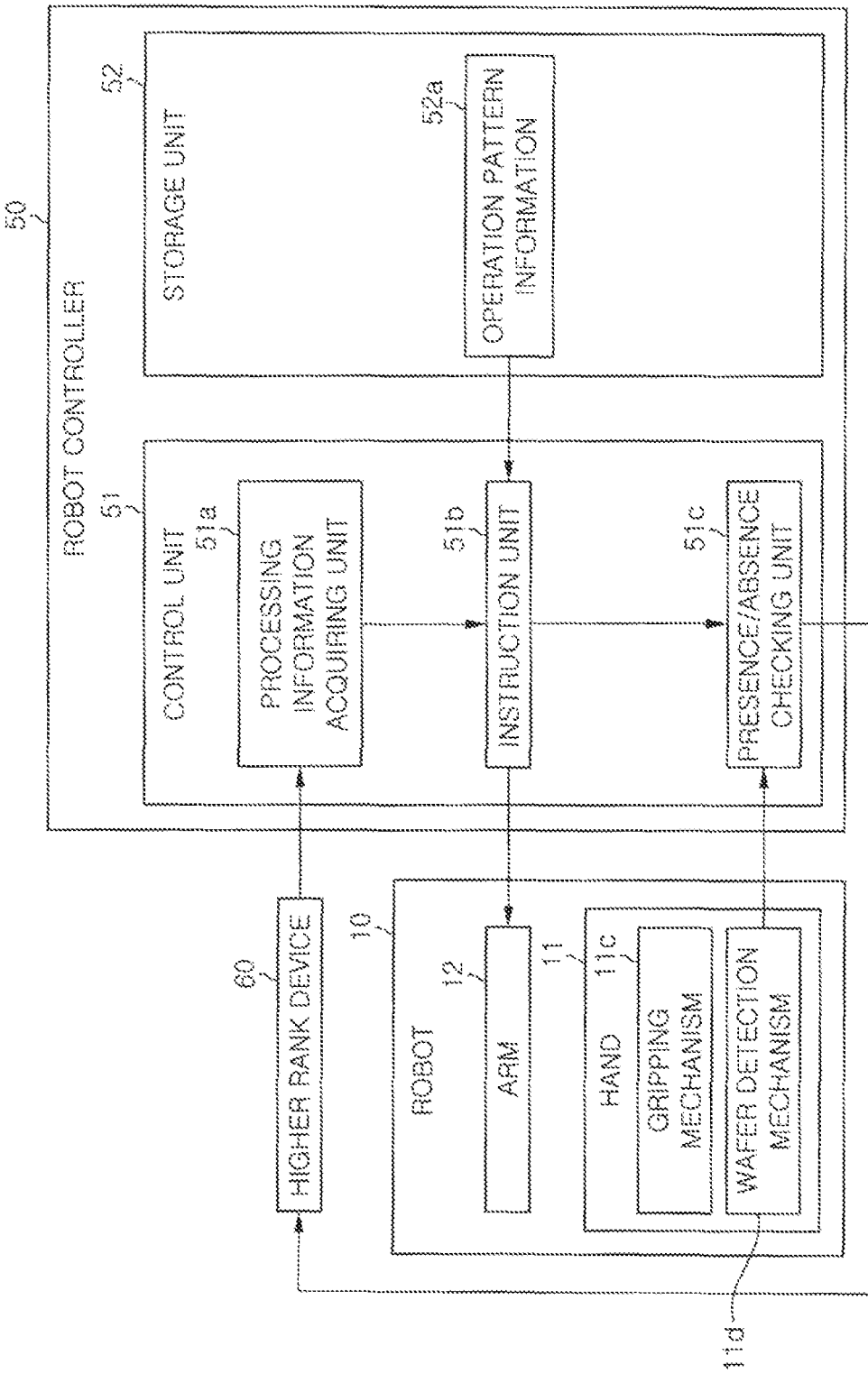
FIG. 5 is a block diagram showing a configuration of a robot controller.

Next, a configuration of the robot controller 50 will be described with reference to FIG. 5. FIG. 5 is a block diagram showing the configuration of the robot controller 50. Further, in FIG. 5, the components necessary to explain features of the robot controller 50 are illustrated, and a description of general components is appropriately omitted.

As shown in FIG. 5, the robot controller 50 includes a control unit 51 and a storage unit 52. Further, the control unit 51 includes a processing information acquiring unit 51a, an instruction unit 51b, and a presence/absence checking unit 51c. Further, operation pattern information 52a is stored in the storage unit 52.

The control unit 51 performs overall control of the robot controller 50. The processing information acquiring unit 51a acquires processing information on a process in which the supply and transfer of the wafer W will be performed, from the upper device 60. Upon acquiring the processing information from the upper device 60, the processing information acquiring unit 51a notifies the instruction unit 51b of the acquired information.

The instruction unit 51b serves as a processing unit which performs the operation instruction for the robot 10 based on the processing information received from the processing information acquiring unit 51a.

Upon receiving the processing information from the processing information acquiring unit 51a, the instruction unit 51b selects an operation pattern according to the processing information among a plurality of operation patterns included in the operation pattern information 52a stored in the storage unit 52. Then, the instruction unit 51b instructs the robot 10 to operate according to the selected operation pattern.

Further, the instruction unit 51b also performs the processing for instructing the presence/absence checking unit 51c to check whether the presence or absence of the wafer W.

The presence/absence checking unit 51c serves as a processing unit which performs the check of the presence or absence of the wafer W on the hand 11 when being instructed from the instruction unit 51b. Specifically, when receiving the instructions to perform the check of the presence or absence from the instruction unit 51b, the presence/absence checking unit 51c acquires information on the light receiving state of the light receiving unit 116d (see FIG. 4A) from the wafer detection mechanism, and determines the presence or absence of the wafer W based on the acquired information.

Specifically, the presence/absence checking unit 51c determines that the wafer W is present on the hand 11 if the light receiving state is "shielding," and determines that the wafer W is absent if the light receiving state is "receiving."

Further, the presence/absence checking unit 51c determines whether the transfer of the wafer W is successful in accordance with the determination result, and notifies the upper device 60 of the determination result.

For example, if it is determined that the wafer W is absent in the case where the robot 10 performs the receiving operation of the wafer W, the presence/absence checking unit 51c determines that the robot 10 has failed to receive the wafer W. In this case, the presence/absence checking unit 51c transmits, to the upper device 60, error information indicating that the robot 10 has failed to receive the wafer W.

Further, the presence/absence checking unit 51c performs multiple times the check of the presence or absence of the wafer W during the wafer receiving operation. Then, the presence/absence checking unit 51c varies the contents of the error to be transmitted to the upper device 60 in the first check and the second and subsequent check. This configuration will be described later.

The storage unit 52 is a storage device such as a hard disk drive and a non-volatile memory, and stores the operation pattern information 52a. The operation pattern information 52a defines an operation of the robot 10.

Further, without storing the operation pattern information 52a, the robot controller 50 may be configured using, e.g., program logic or wired logic, for example, such that the instruction unit 51b can perform the same processing as the case of using the operation pattern information 52a. Further, although one robot controller 50 is illustrated in FIG. 4, a plurality of robot controllers as multiple independent devices may be provided to communicate with each other.

Figure 6A:
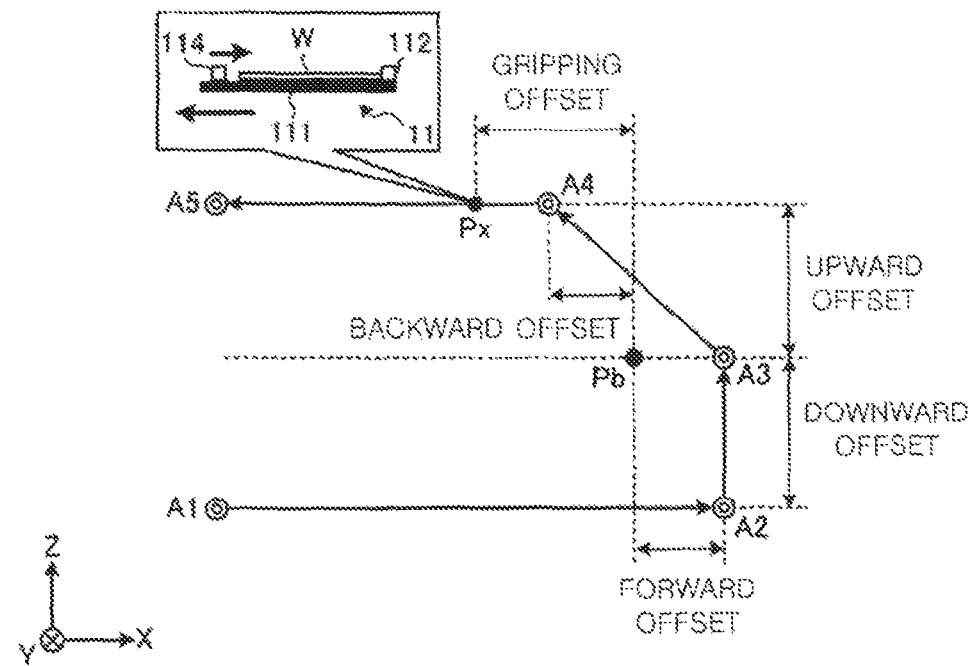
FIG. 6A is an explanatory diagram of a wafer receiving operation in accordance with the first embodiment.
Figure 6B:
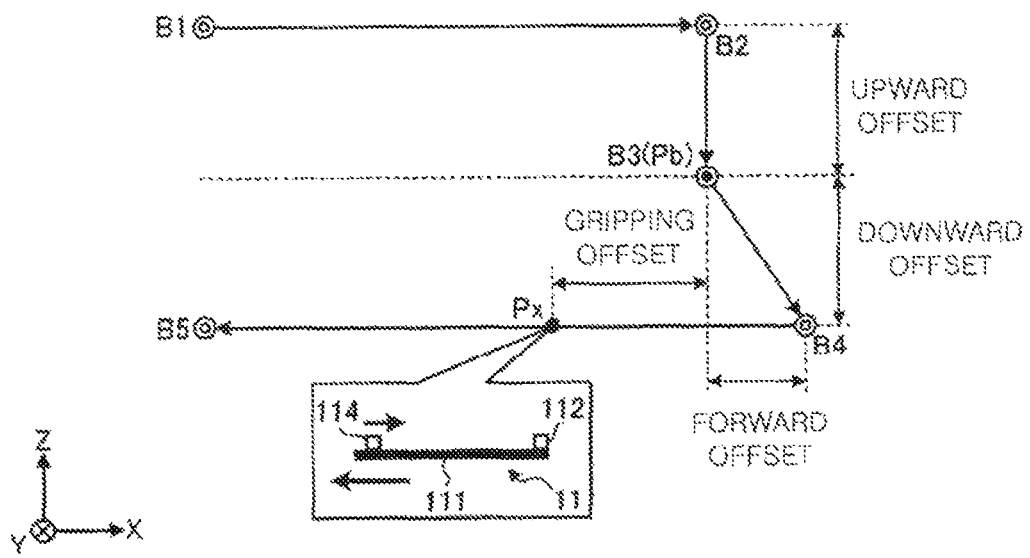
FIG. 6B is an explanatory diagram of a wafer delivery operation in accordance with the first embodiment.

Next, an example of the operation of the robot 10 in accordance with the first embodiment will be described with reference to FIGS. 6A and 6B. FIG. 6A is an explanatory diagram of the wafer receiving operation in accordance with the first embodiment, and FIG. 6B is an explanatory diagram of the wafer delivery operation in accordance with the first embodiment.

Here, the wafer receiving operation is an operation in which the robot 10 receives the wafer W from a wafer accommodating unit such as hoop 30. Further, the wafer delivery operation is an operation in which the robot 10 delivers the wafer W to the processing unit such as the processing device 40.

First, the wafer receiving operation is described with reference to FIG. 6A. As shown in FIG. 6A, the instruction unit 51b instructs the robot 10 to move the hand 11 in a route of positions A1 to A5 based on the processing information and the operation pattern information 52a.

Here, the position A3 is a position where the transfer of the wafer W is performed between the robot 10 and the processing unit. In the following, the position A3 is referred to as "transfer position A3."

Further, the position A1 is a start position of the wafer receiving operation, e.g., a position where the hand 11 is disposed when the robot 10 takes a posture in which the arm 12 is most contracted by the robot 10 (posture in which the turning radius of the robot 10 is minimum).

Further, the position A5 is an end position of the wafer receiving operation which is, for example, is located directly above the start position A1. The start position A1 and the end position A5 are located in the more negative X-axis direction than the transfer position A3. Further, the start position A1 is offset below the transfer position A3, and the end position A5 is offset above the transfer position A3.

Further, position Pb shown in FIG. 6A is a reference position for specifying the position of the gripping operation (hereinafter, referred to as a "gripping position Px"). The reference position Pb can be arbitrarily set in a range in which the gripping position Px is not located in the more positive X-axis direction than the transfer position A3.

The instruction unit 51b performs the horizontal movement (forward movement) of the hand 11 from the start position A1 toward a raising position A2 immediately below the transfer position A3. Subsequently, the instruction unit 51b raises the hand 11 from the raising position A2 to the transfer position A3. Thus, the wafer W is placed on the hand 11.

After the hand 11 has reached the transfer position A3, the instruction unit 51b moves the hand 11 in the negative X-axis direction (backward direction) while moving the hand in the positive Z-axis direction (upward direction) toward a horizontal retracting position A4 which has the same height as the end position A5 and is offset backward from the transfer position A3. Further, the offset between the reference position Pb and the raising position A2 in the horizontal direction is referred to as a "forward offset" and the offset between the reference position Pb and the horizontal retracting position A4 in the horizontal direction is referred to as a "backward offset."

Thus, in the first embodiment, the hand 11 is moved obliquely backward from the transfer position A3 toward the horizontal retracting position A4. Accordingly, as compared with the case where the hand 11 is raised in the vertical direction from the transfer position A3 after the hand 11 has reached the transfer position A3, and then retracted to the horizontal retracting position A4, it is possible to shorten the moving distance of the hand 11 from the transfer position A3 to the horizontal retracting position A4. Therefore, according to the first embodiment, it is possible to shorten the time required for conveyance of the wafer W.

Further, in the first embodiment, since the hand 11 is moved obliquely backward from the transfer position A3 toward the horizontal retracting position A4, it is possible to prevent the rubbing of the wafer W at the time of receipt of the wafer W.

For example, the wafer W accommodated in the hoop 30 (see FIG. 1) may be placed in a state where a side surface of the wafer W is in contact with a member such as a strut provided inside the hoop 30 (in the positive X-axis direction). In this case, when the wafer W is received by raising the hand 11 in the upward vertical direction, the portion of the wafer W in contact with the hoop 30 is rubbed, and there is a possibility that the wafer W is damaged or particles are generated.

In the first embodiment, however, since the hand 11 is obliquely moved backward such that the wafer W is lifted while being moved in a direction away from the inside of the hoop 30, the rubbing of the wafer W does not occur, and it is possible to suppress the damage to the wafer W or the generation of particles.

After the hand 11 has reached the horizontal retracting position A4, the instruction unit 51b retracts the hand 11 to the end position A5. Further, the instruction unit 51b operates the gripping mechanism 11c at the timing when the hand 11 reaches the gripping position Px. In this way, the instruction unit 51b carries out the gripping operation of the wafer W by the gripping mechanism 11c while retracting the hand 11 to the end position A5.

Further, although the example in which the gripping operation of the wafer W is performed while the hand 11 moves from the horizontal retracting position A4 to the end position A5 has been illustrated, the instruction unit 51*b* may instruct the robot 10 to perform the gripping operation while the hand 11 moves from the transfer position A3 to the horizontal retracting position A4.

Subsequently, the instruction unit 51*b* measures the time elapses from when instructing the robot 10 to perform the gripping operation of the wafer W, and instructs the presence/absence checking unit 51*c* to perform the check of the presence or absence when it is determined that a predetermined time has elapsed.

In this case, "predetermined time" as used herein is the same as or slightly longer than the time required until the wafer W is gripped after the forward movement of the pressing part 114. In this manner, the instruction unit 51*b* commands the execution of the check of the presence or absence when the time specified based on the time required until the wafer W is gripped after the forward movement of the pressing part 114 has elapsed. Thus, the instruction unit 51*b* can instruct the presence/absence checking unit 51*c* to perform the check of the presence or absence at the appropriate timing.

Upon receiving the instructions from the instruction unit 51*b*, the presence/absence checking unit 51*c* acquires information on the light receiving state from the wafer detection mechanism, and checks the presence or absence of the wafer W based on the acquired information. That is, the presence/absence checking unit 51*c* determines that the wafer W is present on the hand 11 if the light receiving state is "light-shielding," and determines that the wafer W is absent if the light receiving state is "light-receiving."

As described above, the instruction unit 51*b* performs the check of the presence or absence of the wafer W by operating the gripping mechanism 11*c* while retracting the hand 11 after the hand 11 has reached the transfer position A3. Thus, compared to the case where the gripping operation of the wafer W or the check of the presence or absence is performed independently of the retracting operation of the hand 11, it is possible to reduce the time required for the conveyance of the wafer W.

Further, in the first embodiment, a configuration of gripping the wafer W by holding the wafer W between the front end side engaging part 112 provided on the front end side of the plate 111 and the pressing part 114 provided on the base end side of the plate 111 has been employed by using the gripping mechanism 11*c*. Thus, it is possible to reduce the occurrence of a situation where the wafer W is dropped before the gripping mechanism 11*c* is operated after the hand 11 is retracted.

That is, when retracting the hand 11, the wafer W moves relatively toward the front end side of the hand 11 (in the positive X-axis direction) by inertia. However, since the front end side engaging part 112 is provided on the front end side of the hand 11, even though the hand 11 is retracted prior to operating the gripping mechanism 11*c*, the wafer W is unlikely to fall from the hand 11.

In the case where the robot 10 performs the receiving operation of the wafer W, the instruction unit 51*b* instructs multiple times the presence/absence checking unit 51*c* to perform the check of the presence or absence until the hand 11 reaches the end position A5. Then, the presence/absence checking unit 51*c* makes the contents of the error information to be notified to the higher rank device 60 different between the first check and the second and subsequent checks.

Specifically, if it is checked that the wafer W is absent on the hand 11 in the first check, the presence/absence checking unit 51*c* determines that the robot 10 has failed to receive the wafer W. On the other hand, if it is checked that the wafer W is absent on the hand 11 in the second or subsequent check after it was checked that the wafer W is present on the hand 11 in the first check, the presence/absence checking unit 51*c* determines that the wafer W is dropped from the hand 11.

That is, if the wafer W falls from the hand 11 after the first check in which it is determined that the wafer W is present on the hand 11, it is checked that the wafer W is absent on the hand 11 in the second or subsequent check.

Therefore, the presence/absence checking unit 51*c* determines that the wafer W is dropped from the hand 11 if it is checked that the wafer W is absent on the hand 11 in the second or subsequent check after it was determined that the wafer W is present on the hand 11 in the first check.

As described above, by making the contents of the error information to be notified to the higher rank device different between the first check and the second and subsequent checks, the higher rank device 60 can easily monitor the conveyance state of the wafer W.

Next, the wafer delivery operation will be described. As shown in FIG. 6B, the instruction unit 51*b* instructs the robot 10 to move the hand 11 in a route of positions B1 to B5 based on the processing information and the operation pattern information 52*a*.

Here, the position B1 is a start position, the position B3 is a transfer position, the position B4 is a horizontal retracting position, and the position B5 is an end position. Further, an example where the reference position Pb is set to coincide with the transfer position B3 is illustrated in this case.

The instruction unit 51*b* performs the forward movement of the hand 11 from the start position B1 to lowering position B2 immediately above the transfer position B3. Then, after the wafer W is in a free state by releasing the state of being gripped by the gripping mechanism 11*c*, the instruction unit 51*b* lowers the hand 11 from the lowering position B2 to the transfer position B3. Accordingly, the wafer W placed on the hand 11 is delivered to the processing unit (e.g., processing device 40).

After the hand 11 has reached the transfer position B3, the instruction unit 51*b* moves the hand 11 in the positive X-axis direction (forward direction) while moving the hand in the negative Z-axis direction (downward direction) toward the horizontal retracting position B4 which has the same height as the end position B5 and is offset forward from the transfer position B3.

That is, the instruction unit 51*b* moves the hand 11 obliquely forward from the transfer position B3 toward the horizontal retracting position B4. Accordingly, it is possible to prevent the rubbing of the wafer W at the time of delivery of the wafer W.

At the time of delivery of the wafer W, the wafer W is likely to have a state of being in contact with the tip end side engaging part 112 of the gripping mechanism 11*c*. In this case, if the wafer W is delivered by lowering the hand 11 in the downward vertical direction, the wafer W is rubbed by the tip end side engaging part 112, and there is a possibility that the wafer W is damaged or particles are generated.

In the first embodiment, however, since the hand 11 is obliquely moved forward such that the tip end side engaging part 112 is lowered while being moved in a direction away from the wafer W, the rubbing of the wafer W does not occur. As a result, it is possible to suppress the damage to the wafer W or the generation of particles.

After the hand 11 has reached the horizontal retracting position B4, the instruction unit 51*b* retracts the hand 11 to the end position B5. Then, the instruction unit 51*b* operates the gripping mechanism 11c to check the presence or absence of the wafer W at the timing when the hand 11 reaches the gripping position Px.

Further, the instruction unit 51b measures the time elapses from when instructing the robot 10 to perform the gripping operation, and instructs the presence/absence checking unit 51c to perform the check of the presence or absence when a predetermined time is elapsed.

Upon receiving the instructions from the instruction unit 51b, the presence/absence checking unit 51c acquires the information on the light receiving state from the wafer detection mechanism, and checks the presence or absence of the wafer W based on the acquired information. Then, the presence/absence checking unit 51c determines that the delivery of the wafer W has been failed when it is determined that the wafer W is on the hand 11, and notifies the determination result to the higher rank device 60 (see FIG. 2).

In this way, similarly to the wafer receiving operation described with reference to FIG. 6A, the instruction unit 51b performs the check of the presence or absence of the wafer W by operating the gripping mechanism 11c while retracting the hand 11 after the hand 11 has reached the horizontal retracting position B4. Thus, compared to the case where the gripping operation of the wafer W or the check of the presence or absence is performed independently of the retracting operation of the hand 11, it is possible to reduce the time required for the conveyance of the wafer W.

Next, a specific operation of the robot system 1 will be described with reference to FIGS. 7 and 8. First, a processing procedure of a wafer receiving process will be described with reference to FIG. 7. FIG. 7 is a flowchart showing a processing procedure of a wafer receiving process. Further, although a processing procedure where the gripping mechanism 11c is operated after the hand 11 starts the backward movement in the horizontal direction is illustrated in FIG. 7, the operation timing of the gripping mechanism 11c may be prior to the time when the hand 11 starts the backward movement in the horizontal direction.

As shown in FIG. 7, the instruction unit 51b of the robot controller 50 moves the hand 11 from the start position A1 to the transfer position A3 (step S101). Then, after the hand 11 has reached the transfer position A3, the instruction unit 51b moves the hand 11 obliquely backward until it reaches the horizontal retracting position A4 (step S102).

Subsequently, when the hand 11 reaches the horizontal retracted position A4, the instruction unit 51b initiates the backward movement of the hand 11 in the horizontal direction (step S103). Further, the instruction unit 51b operates the gripping mechanism 11c at the timing when the hand 11 reaches the gripping position Px (step S104).

When a predetermined time has elapsed after operating the gripping mechanism 11c, the presence/absence checking unit 51c determines whether or not the wafer W is present on the hand 11 (step S105). In this process, if it is determined that the wafer W is absent on the hand 11 (No in step S105), the instruction unit 51b stops the robot 10 (step S106). Further, the presence/absence checking unit 51c notifies the higher rank device 60 of error information indicating that the receipt of the wafer W has been failed (step S107).

On the other hand, when it is determined that the wafer W is present on the hand 11 in step S105 (Yes in step S105), the instruction unit 51b determines whether the hand 11 has reached the end position A5 (step S108). Then, if the hand 11 has not reached the end position A5 (No in step S108), the presence/absence checking unit 51c determines again whether the wafer W is present or absent on the hand (step S109). If it is determined that the wafer W is present on the hand 11 (Yes in step S109), the process is returned to step S108. Further, the determination process of step S109 is performed at a predetermined time interval.

Also, if it is determined in step S109 that the wafer W is absent on the hand 11 (No in step S109), the instruction unit 51b stops the robot 10 (step S110). Further, the presence/absence checking unit 51c notifies the higher rank device 60 of the error information indicating that the wafer W has fallen (step S111).

On the other hand, if it is determined in step S108 that the hand 11 has reached the end position (Yes in step S108), the robot controller 50 stops the backward movement of the hand 11 (step S112), and the process is terminated. Also when the robot controller 50 has finished the processing of step S107 and step S111, the process is terminated.

Next, a processing procedure of a wafer delivery process will be described with reference to FIG. 8. FIG. 8 is a flowchart showing a processing procedure of a wafer delivery process. Further, although a processing procedure where the gripping mechanism 11c is operated after the hand 11 starts the backward movement in the horizontal direction is illustrated in FIG. 8, the operation timing of the gripping mechanism 11c may be prior to the time when the hand 11 starts the backward movement in the horizontal direction.

Figure 8:
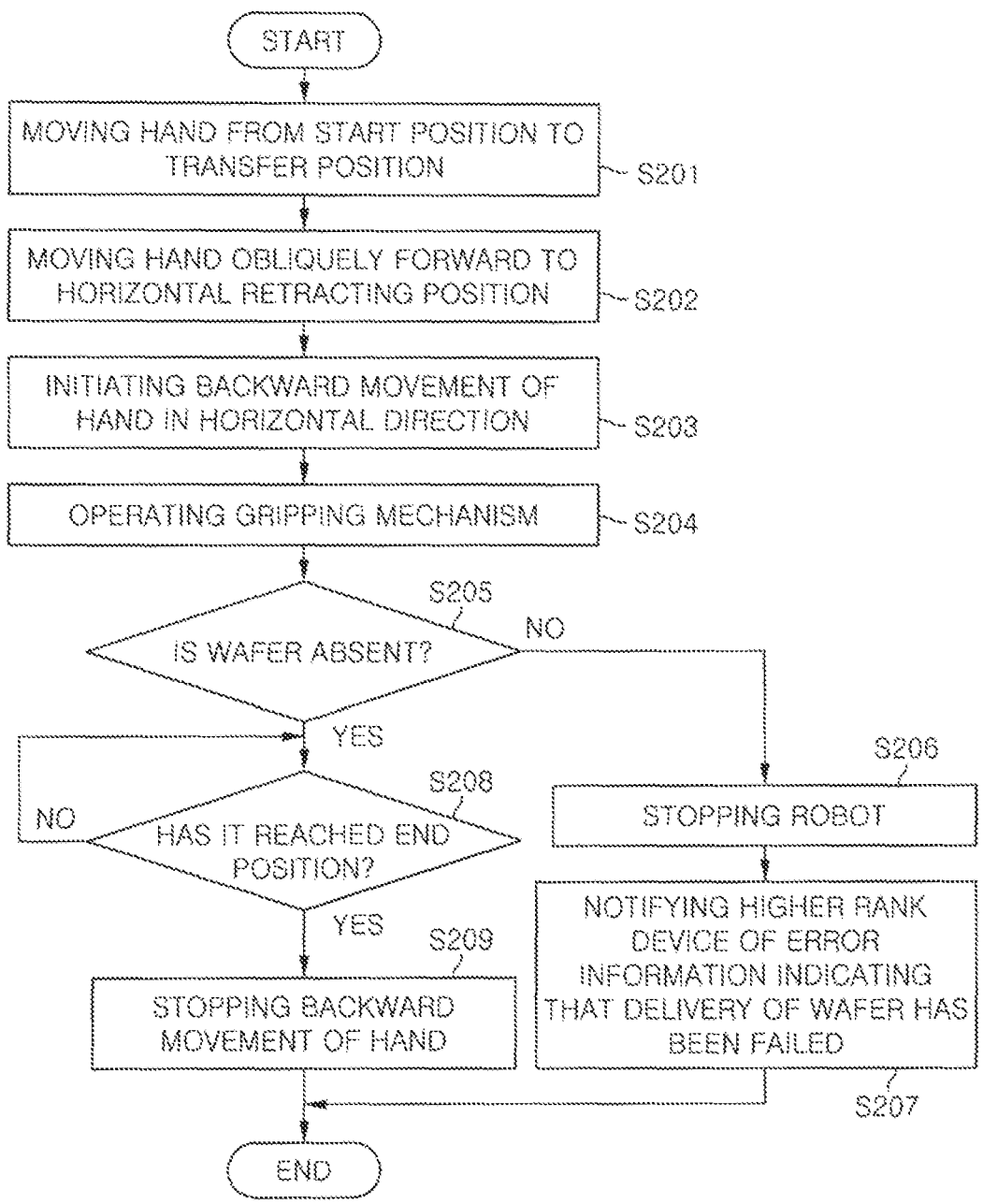
FIG. 8 is a flowchart showing a processing procedure of a wafer delivery process.

As shown in FIG. 8, the instruction unit 51b of the robot controller 50 moves the hand 11 from the start position B1 to the transfer position B3 (step S201). Then, after the hand 11 has reached the transfer position B3, the instruction unit 51b moves the hand 11 obliquely forward until it reaches the horizontal retracting position B4 (step S202).

Subsequently, after the hand 11 has reached the horizontal retracting position B4, the instruction unit 51b initiates the backward movement of the hand 11 in the horizontal direction (step S203). Further, the instruction unit 51b operates the gripping mechanism 11c at the timing when the hand 11 reaches the gripping position Px (step S204).

When a predetermined time has elapsed after operating the gripping mechanism 11c, the presence/absence checking unit 51c checks whether or not the wafer W is absent on the hand 11 (step S205). If it is determined that the wafer W is present on the hand 11 (No in step S205), the instruction unit 51b stops the robot 10 (step S206). Further, the presence/absence checking unit 51c notifies the higher rank device 60 of the error information indicating that the delivery of the wafer W has been failed (step S207).

On the other hand, when it is determined that the wafer W is absent on the hand 11 in step S205 (Yes in step S205), the instruction unit 51b determines whether the hand 11 has reached the end position B5 (step S208). Then, if it is determined that the hand 11 has reached the end position B5 (Yes in step S208), the instruction unit 51b stops the backward movement of the hand 11 (step S209), and the process is terminated.

If the hand 11 has not reached the end position B5 (No in step S208), the processing of step S208 is repeated until the hand 11 reaches the end position B5. Also when the robot controller 50 has finished the processing of step S207, the process is terminated.

As described above, the robot system 1 in accordance with the first embodiment includes the robot 10 and the robot controller 50. The robot 10 includes the hand 11 having the gripping mechanism 11c for gripping the wafer W, and the arm 12 for moving the hand 11. Further, the robot controller 50 controls the robot 10. The robot controller 50 controls the robot 10 to perform the transfer of the wafer W at the transfer position. In this case, after the hand 11 has reached the transfer position, the check of the presence or absence of the wafer W is performed by operating the gripping mechanism 11c while retracting the hand 11.

Thus, according to the robot system 1 in accordance with the first embodiment, it is possible to shorten the time required for the conveyance of the wafer W.

Further, the robot controller 50 in accordance with the first embodiment controls the robot 10 to perform the transfer of the wafer W at the transfer position such that, after the hand 11 has reached the transfer position, the hand 11 is also moved in the horizontal direction while being moved in the vertical direction.

Thus, according to the robot system 1 in accordance with the first embodiment, it is possible to prevent the rubbing of the wafer W at the time of transfer of the wafer W.

Second Embodiment

The wafer receiving operation and the wafer delivery operation are not limited to the operation pattern shown in the first embodiment.

Figure 9A:
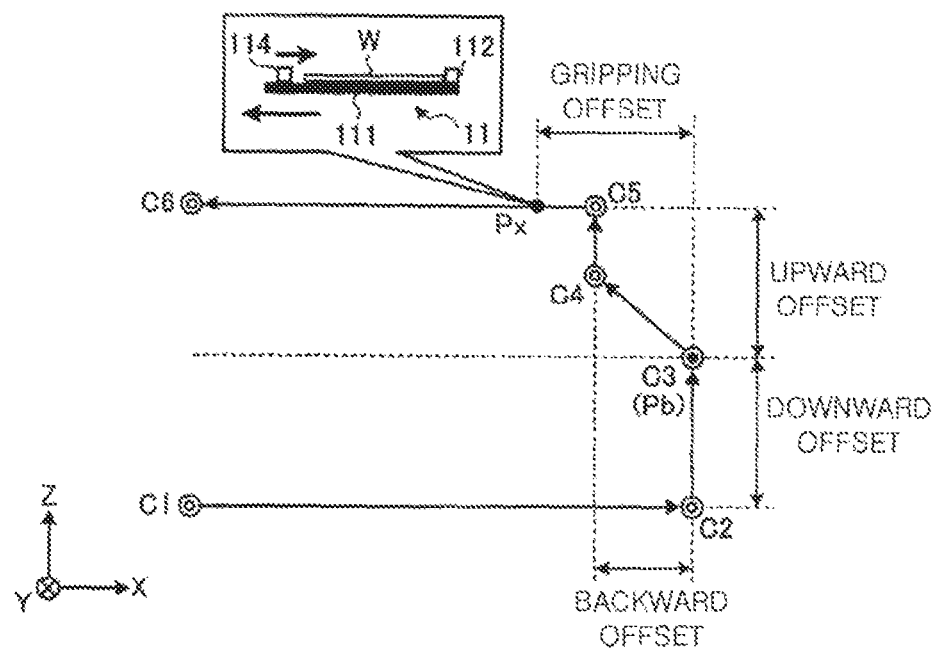
FIG. 9A is an explanatory diagram of a wafer receiving operation in accordance with a second embodiment.
Figure 9B:
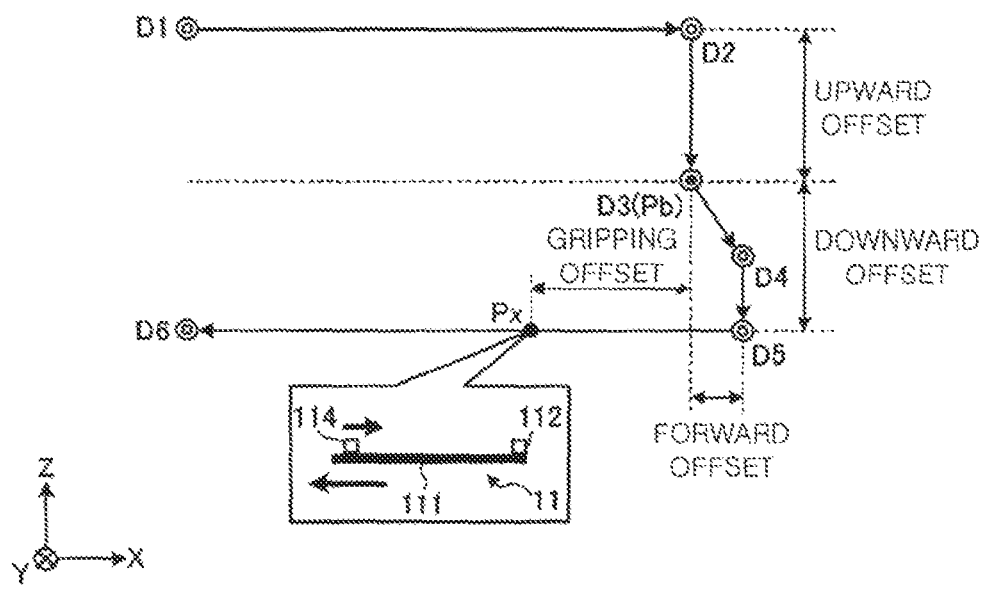
FIG. 9B is an explanatory diagram of a wafer delivery operation in accordance with the second embodiment.

Hereinafter, another operation example of the wafer receiving operation and the wafer delivery operation will be described with reference to FIGS. 9A and 9B. FIG. 9A is an explanatory diagram of the wafer receiving operation in accordance with a second embodiment, and FIG. 9B is an explanatory diagram of the wafer delivery operation in accordance with the second embodiment.

First, the wafer receiving operation in accordance with the second embodiment is described with reference to FIG. 9A. As shown in FIG. 9A, the instruction unit 51b instructs the robot 10 to move the hand 11 in a route of positions C1 to C6 based on the processing information and the operation pattern information 52a.

Here, the position C1 is a start position, the position C3 is a transfer position, the position C5 is a horizontal retracting position, and the position C6 is an end position. Further, an example where the reference position Pb is set to coincide with the transfer position C3 is illustrated in the present embodiment.

The instruction unit 51b performs the forward movement of the hand 11 from the start position C1 toward a raising position C2 immediately below the transfer position C3. Subsequently, the instruction unit 51b raises the hand 11 from the raising position C2 to the transfer position C3. Thus, the wafer W is placed on the hand 11.

After the hand 11 has reached the transfer position C3, the instruction unit 51b moves the hand 11 obliquely backward toward a position C4 which has a height between the transfer position C3 and the end position C6 and is located immediately below the horizontal retracting position C5. Then, the instruction unit 51b raises the hand 11 from the position C4 toward the horizontal retracting position C5, and then retracts the hand 11 to the end position C6.

Next, the wafer delivery operation will be described with reference to FIG. 9B. As shown in FIG. 9B, the instruction unit 51b instructs the robot 10 to move the hand 11 in a route of positions D1 to D6 based on the processing information and the operation pattern information 52a.

Here, the position D1 is a start position, the position D3 is a transfer position, the position D5 is a horizontal retracting position, and the position D6 is an end position. As in the case of FIG. 9A, an example where the reference position Pb is set to coincide with the transfer position D3 is illustrated.

The instruction unit 51b performs the forward movement of the hand 11 from the start position D1 toward a lowering position D2 immediately above the transfer position D3.

Then, after the wafer W becomes in a free state by releasing the state of being gripped by the gripping mechanism 11c, the instruction unit 51b lowers the hand 11 from the lowering position D2 to the transfer position D3. Accordingly, the wafer W placed on the hand 11 is delivered to the processing unit (e.g., processing device 40).

After the hand 11 has reached the transfer position D3, the instruction unit 51b moves the hand 11 obliquely forward toward a position D4 which has a height between the transfer position D3 and the end position D6 and is located immediately above the horizontal retracted position D5. Then, the instruction unit 51b lowers the hand 11 from the position D4 toward the horizontal retracting position D5, and then retracts the hand 11 to the end position D6.

In this manner, in the second embodiment, after moving the hand 11 in the horizontal direction while moving it in the vertical direction from the transfer position, the hand is further moved in the vertical direction, and then retracted in the horizontal direction.

This operation pattern is effective, for example, when a working space is relatively small. That is, by using the operation pattern according to the second embodiment, the robot 10 can perform the delivery of the wafer W while preventing the rubbing of the wafer W even if the working space is relatively small.

For example, there may be some cases where an inside space is narrow due to a shape or size of the processing unit, and it is impossible to take an effective distance from the transfer position to the horizontal retracting position. By using the operation pattern shown in FIG. 9B in this case, even when the depth of the processing unit is small, it is possible to effectively move the hand 11 obliquely forward, and properly prevent the rubbing of the wafer W.

Further, in the first embodiment, the hand 11 is moved obliquely until it reaches the horizontal retracting position from the transfer position. However, this operation pattern is effective, for example, when the working space is relatively large. That is, in the case of using the operation pattern shown in FIGS. 6A and 6B, since there are fewer stopping points of the hand 11 as compared with the operation pattern shown in FIGS. 9A and 9B, it is possible to shorten the time required for the transfer of the wafer W.

Third Embodiment

In the first embodiment and the second embodiment, the example in which the hand 11 is moved obliquely after the hand 11 reaches the transfer position has been illustrated. However, the hand 11 may be moved obliquely before reaching the transfer position.

Figure 10A:
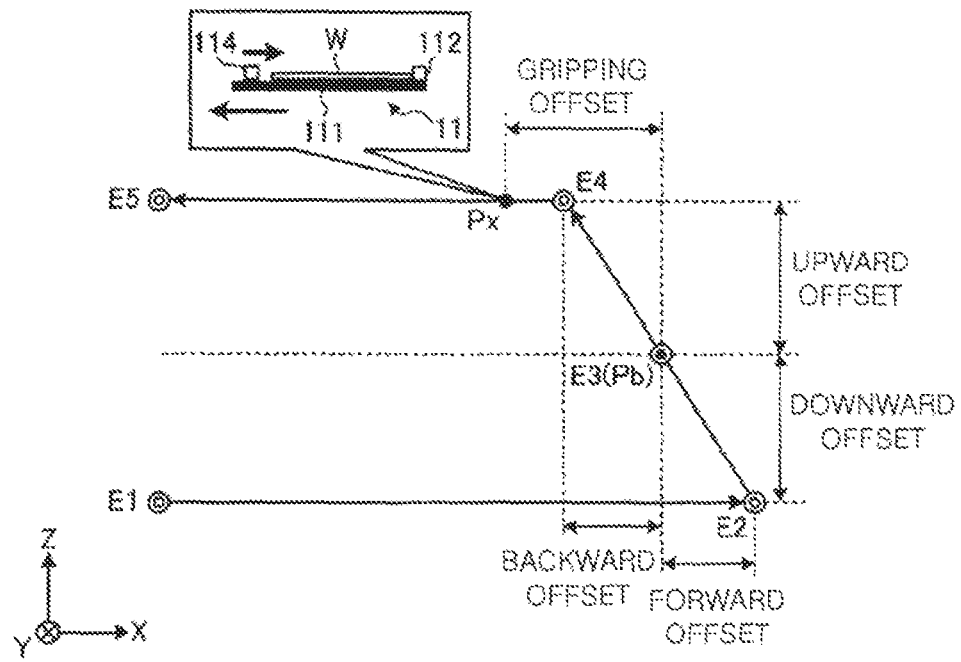
FIG. 10A is an explanatory diagram of a wafer receiving operation in accordance with a third embodiment.
Figure 10B:
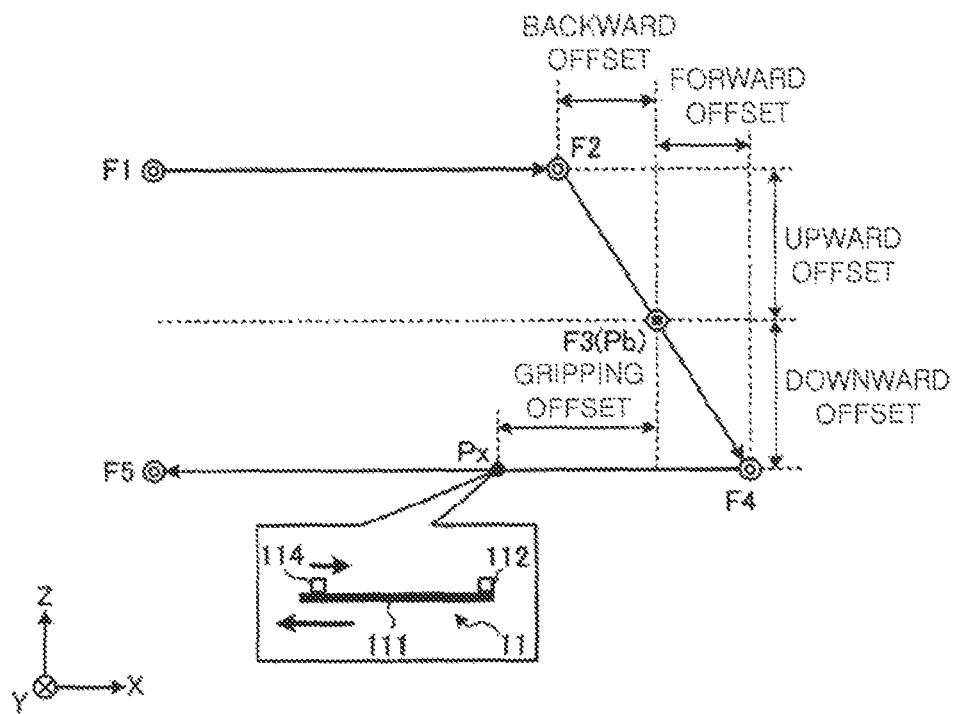
FIG. 10B is an explanatory diagram of a wafer delivery operation in accordance with the third embodiment.

Hereinafter, the wafer receiving operation and the wafer delivery operation in accordance with a third embodiment will be described with reference to FIGS. 10A and 10B. FIG. 10A is an explanatory diagram of the wafer receiving operation in accordance with the third embodiment, and FIG. 10B is an explanatory diagram of the wafer delivery operation in accordance with the third embodiment.

First, the wafer receiving operation in accordance with the third embodiment is described with reference to FIG. 10A. As shown in FIG. 10A, the instruction unit 51b instructs the robot 10 to move the hand 11 in a route of positions E1 to E5 based on the processing information and the operation pattern information 52a.

Here, the position E1 is a start position, the position E3 is a transfer position, the position E4 is a horizontal retracting position, and the position E5 is an end position. In the operation pattern according to the third embodiment, the position E2, the transfer position E3 and the horizontal retracting position E4 are arranged side by side in a straight line. Further, the reference position Pb is set to coincide with the transfer position E3 in the present embodiment.

The instruction unit 51*b* performs the forward movement of the hand 11 from the start position E1 toward a position E2 below and forward of the transfer position E3. Subsequently, when the hand 11 reaches the position E2, the instruction unit 51*b* moves the hand 11 obliquely backward toward the horizontal retracting position E4.

At this time, since the position E2, the transfer position E3 and the horizontal retracted position E4 are arranged along a straight line, the hand 11 reaches the horizontal retracting position E4 after obliquely passing through the transfer position E3. Further, when the hand 11 passes through the transfer position E3, the wafer W is placed on the hand 11.

After the hand 11 has reached the horizontal retracting position E4, the instruction unit 51*b* retracts the hand 11 to the end position E5.

Next, the wafer delivery operation in accordance with the third embodiment will be described with reference to FIG. 10B. As shown in FIG. 10B, the instruction unit 51*b* instructs the robot 10 to move the hand 11 in a route of positions F1 to F5 based on processing information and operation pattern information 52*a*.

Here, the position F1 is a start position, the position F3 is a transfer position, the position F4 is a horizontal retracting position, and the position F5 is an end position. As in the case of FIG. 10A, the position F2, the transfer position F3 and the horizontal retracted position F4 are arranged side by side in a straight line. Further, the reference position Pb is set to coincide with the transfer position F3.

The instruction unit 51*b* performs the forward movement of the hand 11 from the start position F1 toward a position F2 above and backward of the transfer position F3. Subsequently, when the hand 11 reaches the position F2, the instruction unit 51*b* moves the hand 11 obliquely forward toward the horizontal retracting position F4.

Thus, as in the case shown in FIG. 10A, the hand 11 reaches the horizontal retracting position F4 after obliquely passing through the transfer position F3. Further, as the hand 11 passes through the transfer position F3, the wafer W placed on the hand 11 is delivered to the processing unit (e.g., processing device 40). After the hand 11 has reached the horizontal retracting position F4, the instruction unit 51*b* retracts the hand 11 to the end position F5.

Thus, in the third embodiment, after the hand 11 has reached a predetermined position (position F2) above and backward of the transfer position F3 or a predetermined position (position E2) below and forward of the transfer position E3, the hand 11 is moved in the horizontal direction while being moved in the vertical direction so that the hand 11 reaches the transfer position F3 or E3. Thus, it is possible to more reliably prevent the rubbing of the wafer W.

That is, in the robot system, the transfer position specified by the robot controller may be slightly deviated from an actual transfer position. In such a case, even if the deviation of the transfer position occurs, it is possible to properly prevent the rubbing of the wafer W by moving the hand 11 obliquely before and after passing through the transfer position E3 or F3 specified by the robot controller 50.

Further, the operation pattern according to the third embodiment is effective when the working space is relatively large in the same way as the operation pattern according to the first embodiment. That is, in the case of using the operation pattern according to the third embodiment, since there are fewer stopping points of the hand 11 as compared with the operation pattern according to the second embodiment, it is possible to shorten the time required for the conveyance of the wafer W.

Further, in the third embodiment, the position E2, the transfer position E3 and the horizontal retracting position E4, or the position F2, the transfer position F3 and the horizontal retracting position F4 are arranged in a straight line. Accordingly, the instruction unit 51*b* can move the hand 11 obliquely without stopping the hand 11 at the transfer position E3 or F3. Thus, compared to the operation pattern according to the first embodiment and the second embodiment, it is possible to further reduce the number of the stopping points, and shorten the time required for the conveyance of the wafer W.

Figure 11A:
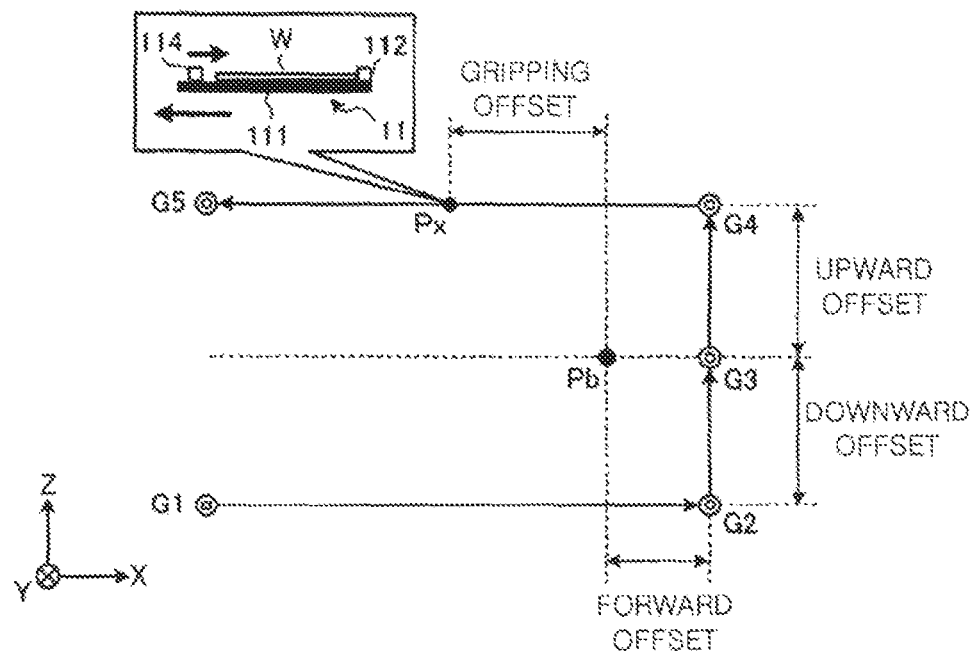
FIG. 11A is an explanatory diagram of the wafer receiving operation in accordance with another example.
Figure 11B:
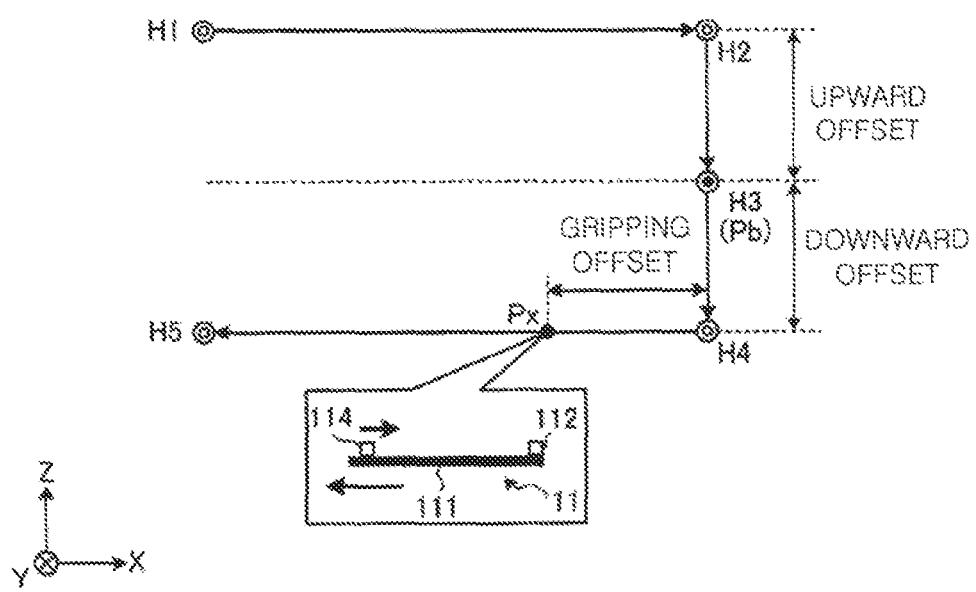
FIG. 11B is an explanatory diagram of the wafer delivery operation in accordance with another example.

In each of the above-described embodiments, the example of moving the hand 11 obliquely has been described, but the instruction unit 51*b* is not necessarily required to move the hand 11 obliquely. Hereinafter, an example of such a case will be described with reference to FIGS. 11A and 11B. FIG. 11A is an explanatory diagram of the wafer receiving operation, and FIG. 11B is an explanatory diagram of the wafer delivery operation.

In the case where the robot 10 performs the wafer receiving operation, as shown in FIG. 11A, the instruction unit 51*b* instructs the robot 10 to move the hand 11 in a route of positions G1 to G5. Here, the position G1 is a start position, the position G2 is a raising position, the position G3 is a transfer position, the position G4 is a horizontal retracting position, and the position G5 is an end position.

In this embodiment, the raising position G2, the horizontal retracting position G4 and the transfer position G3 are arranged in a straight line in the vertical direction, and the vertical straight line is offset inward (forward) from the reference position Pb. Further, the hand 11 moves only in the horizontal direction between the start position G1 and the raising position G2 and between the horizontal retracting position G4 and the end position G5, and moves only in the vertical direction between the raising position G2 and the transfer position G3 and between the transfer position G3 and the horizontal retracting position G4.

By doing so, after advancing the hand 11 to the position G2 which is offset forward from the reference position Pb, the instruction unit 51*b* raises the hand 11 in the upward vertical direction such that the wafer W is placed at the position G3 which has the same height as the reference position Pb and is offset forward. Then, after raising the hand 11 to the position G4 in the upward vertical direction, the hand 11 is retracted to move horizontally to the position G5. Further, the check of the presence or absence of the wafer is performed by gripping the wafer W at the time passing through the gripping position Px. Thus, it is possible to reliably prevent the periphery of the wafer W from being rubbed or in contact with the front end of the hand at the time of receiving the wafer W.

On the other hand, in the case where the robot 10 performs the wafer delivery operation, as shown in FIG. 11B, the instruction unit 51*b* instructs the robot 10 to move the hand 11 in a route of positions H1 to H5. Here, the position H1 is a start position, the position H2 is a lowering position, the position H3 is a transfer position, the position H4 is a horizontal retracting position, and the position H5 is an end position. In the transfer position of this example, the transfer position H3 is set to coincide with the reference position Pb.

The lowering position H2, the horizontal retracting position H4 and the transfer position H3 are arranged in a straight line in the vertical direction. Further, the hand 11 moves only in the horizontal direction between the start position H1 and the lowering position H2 and between the horizontal retracting position H4 and the end position H5, and moves only in the vertical direction between the lowering position H2 and the transfer position H3 and between the transfer position H3 and the horizontal retracting position H4.

As described above, the robot system 1 may include the operation pattern in which the hand 11 is not moved obliquely.

Further, in each of the above-described embodiments, the wafer receiving operation and the wafer delivery operation have been described using a plurality of operation patterns. However, the robot controller 50 may switch the operation pattern appropriately according to the processing unit where the wafer is loaded or unloaded. That is, by selecting an appropriate operation pattern according to the shape or size of the processing unit, it is possible to more reliably prevent the rubbing of the wafer W.

Further, in each of the above-described embodiments, the case where two hands are provided on the tip end of one arm has been described as an example. However, the number of hands is not limited thereto, and three or more arms may be provided, or only one arm may be provided.

Further, in each of the above-described embodiments, the robot having one arm has been described as an example, but it may be applied to a multi-arm robot having two or more arms.

Further, in each of the above-described embodiments, the case where a thin plate-shaped workpiece to be transferred is a wafer has been described as an example, but the workpiece to be transferred may be, e.g., a glass substrate of a liquid crystal panel display. Further, the workpiece is not necessarily required to be a substrate as long as it has a thin plate shape.

It should be understood by those skilled in the art that various modifications, combinations, sub-combinations and alterations may occur depending on design requirements and other factors insofar as they are within the scope of the appended claims or the equivalents thereof.

The invention claimed is:

1. A robot system comprising:
a robot including a hand configured to hold a thin plate-shaped workpiece and an arm configured to move the hand; and
a robot controller configured to control the robot,
wherein the hand includes a gripping mechanism configured to grip the workpiece,
wherein the gripping mechanism includes a tip end side engaging part disposed at a tip end of the hand and a pressing part disposed at a base end of the hand, the pressing part is configured to push the workpiece toward the tip end side engaging part,
wherein the robot controller controls the robot to perform a delivery of the workpiece held by the hand from the hand to a workpiece support member other than the hand at a workpiece transfer position in such a way that upon reaching the workpiece transfer position, the hand is moved in a horizontal direction while being moved in a vertical direction,
wherein, after moving the hand in the horizontal direction while moving the hand in the vertical direction from the workpiece transfer position, the robot controller operates the gripping mechanism to check a presence or absence of the workpiece while retracting the hand, and
wherein, when a predetermined time has elapsed after operating the gripping mechanism, the robot controller checks the presence or absence of the workpiece on the hand and the robot controller stops the robot when the workpiece is on the hand.

2. The robot system of claim 1, wherein, after moving the hand in the horizontal direction while moving the hand in the vertical direction from the workpiece transfer position, the robot controller retracts the hand in the horizontal direction.

3. The robot system of claim 1, wherein, after moving the hand in the horizontal direction while moving the hand in the vertical direction from the workpiece transfer position, the robot controller further moves the hand in the vertical direction and then retracts the hand in the horizontal direction.

4. The robot system of claim 1, wherein the robot controller controls the hand to reach the workpiece transfer position by moving the hand in the vertical direction after the hand reaches a position overlapping the workpiece transfer position in the vertical direction.

5. The robot system of claim 2, wherein the robot controller controls the hand to reach the workpiece transfer position by moving the hand in the vertical direction after the hand reaches a position overlapping the workpiece transfer position in the vertical direction.

6. The robot system of claim 3, wherein the robot controller controls the hand to reach the workpiece transfer position by moving the hand in the vertical direction after the hand reaches a position overlapping the workpiece transfer position in the vertical direction.

7. The robot system of claim 1, wherein the robot controller controls the hand to reach the workpiece transfer position by moving the hand in the horizontal direction while moving the hand in the vertical direction after the hand reaches a predetermined position above and backward of the workpiece transfer position.

8. The robot system of claim 2, wherein the robot controller controls the hand to reach the workpiece transfer position by moving the hand in the horizontal direction while moving the hand in the vertical direction after the hand reaches a predetermined position above and backward of the workpiece transfer position.

9. The robot system of claim 3, wherein the robot controller controls the hand to reach the workpiece transfer position by moving the hand in the horizontal direction while moving the hand in the vertical direction after the hand reaches a predetermined position above and backward of the workpiece transfer position.

10. The robot system of claim 1, wherein the robot controller checks the presence or absence of the workpiece only after retraction of the hand has begun.

* * * * *